United States Patent
Lee et al.

(10) Patent No.: US 12,443,828 B2
(45) Date of Patent: Oct. 14, 2025

(54) METHOD OF LIGHTWEIGHTING A NEURAL NETWORK FOR OBJECT RECOGNITION, A METHOD OF RECOGNIZING OBJECT USING THE LIGHTWEIGHTED NEURAL NETWORK, AND AN ELECTRONIC DEVICE FOR PERFORMING THE SAME

(71) Applicant: NOTA, INC., Daejeon (KR)

(72) Inventors: Hyungjun Lee, Daejeon (KR); Hancheol Park, Daejeon (KR)

(73) Assignee: NOTA, INC., Daejeon (KR)

( * ) Notice: Subject to any disclaimer, the term of this patent is extended or adjusted under 35 U.S.C. 154(b) by 0 days.

(21) Appl. No.: 18/932,549

(22) Filed: Oct. 30, 2024

(65) Prior Publication Data
US 2025/0156696 A1   May 15, 2025

(30) Foreign Application Priority Data
Nov. 9, 2023  (KR) ........................ 10-2023-0154173

(51) Int. Cl.
*G06N 3/0495* (2023.01)
*G06N 3/082* (2023.01)
(Continued)

(52) U.S. Cl.
CPC ........... *G06N 3/0495* (2023.01); *G06N 3/082* (2013.01); *G06T 7/62* (2017.01); *G06V 10/764* (2022.01)

(58) Field of Classification Search
CPC ........ G06N 3/0495; G06N 3/082; G06T 7/62; G06V 10/764
See application file for complete search history.

(56) References Cited

U.S. PATENT DOCUMENTS 8,705,876 B2 * 4/2014 Vaddadi ............... G06V 10/757
                                                                  382/225
11,657,284 B2 * 5/2023 Kim ...................... G06N 3/082
                                                                  706/25
(Continued)

FOREIGN PATENT DOCUMENTS

KR       10-2442928 B1      9/2022
KR       10-2461998 B1     11/2022
(Continued)

OTHER PUBLICATIONS

Gupta, Chhaya (2023) "A novel finetuned YOLOv6 transfer learning model for real-time object detection", Journal of Real-Time Image Processing. doi: https://doi.org/10.1007/s11554-023-01299-3.

(Continued)

*Primary Examiner* — Dhaval V Patel
(74) *Attorney, Agent, or Firm* — BROADVIEW IP LAW, PC

(57) ABSTRACT

A method of compressing a neural network model for object recognition according to an embodiment of the present application includes: receiving an original model for object recognition trained based on a first data set; receiving a second data set of an analysis target; calculating object size information on sizes of objects included in an image of the second data set; performing pruning on at least one layer included in the original model based on the calculated object size information; and generating a compressed neural network model from the original model based on the results of performing the pruning.

17 Claims, 8 Drawing Sheets

(51) Int. Cl.
G06T 7/62 (2017.01)
G06V 10/764 (2022.01)

(56) References Cited

U.S. PATENT DOCUMENTS

| | | | |
|---|---|---|---|
| 2022/0253708 A1* | 8/2022 | Tamada | G06F 18/214 |
| 2023/0289604 A1* | 9/2023 | Chan | G06F 21/577 |
| 2023/0297846 A1* | 9/2023 | Yin | G06N 3/0464 |
| | | | 706/15 |
| 2023/0368010 A1* | 11/2023 | Shim | G06N 3/063 |

FOREIGN PATENT DOCUMENTS

| | | |
|---|---|---|
| KR | 10-2508886 B1 | 3/2023 |
| KR | 10-2567539 B1 | 8/2023 |

OTHER PUBLICATIONS

Office Action for KR 10-2023-0154173 by Korean Intellectual Property Office dated Mar. 8, 2024.
Notice of Allowance for KR 10-2023-0154173 by Korean Intellectual Property Office date Sep. 19, 2024.

* cited by examiner

SECOND DATA SET → NUMBER OF PIXELS → OBJECT SIZE INFORMATION L:a% M:b% S:c%

S1400

G1

G2

G3

METHOD OF LIGHTWEIGHTING A NEURAL NETWORK FOR OBJECT RECOGNITION, A METHOD OF RECOGNIZING OBJECT USING THE LIGHTWEIGHTED NEURAL NETWORK, AND AN ELECTRONIC DEVICE FOR PERFORMING THE SAME

CROSS-REFERENCE TO RELATED APPLICATION

This application claims priority under 35 U.S.C § 119 to Korean Patent Application No. 10-2023-0154173 filed in the Korean Intellectual Property Office on Nov. 9, 2023, the disclosure of which is incorporated herein by reference in its entirety.

BACKGROUND

1. Technical Field

The present application relates to compressing of a neural network model, and more particularly, to a method of compressing a neural network model for object recognition using a pruning technique, a method of recognizing an object using a compressed neural network model, and/or a device for performing the same.

2. Related Art

As artificial intelligence technologies develop, the artificial intelligence technologies are being used in various industry fields. Accordingly, the scale and computational complexity of recently proposed deep neural network models have rapidly increased for high performance. On the other hand, the increased scale and computational complexity are constrained by the lack of usability and accessibility in situations where hardware resources are limited. Accordingly, technologies are being actively developed to make deep neural network models compress while maintaining the performance of the deep neural network models.

Network pruning exists as one of the technologies for compressing deep neural network models. For the network pruning, it is important to determine a pruning ratio while minimizing the reduction in performance of the deep neural network. Methods of determining a pruning ratio of a deep neural network are largely divided into local pruning techniques, in which each layer of a deep neural network is pruned at the same rate, and global pruning techniques, in which a pruning ratio is set for the entire neural network to prune each layer at a different ratio. In general, it is known that global pruning techniques have the advantage of reducing the risk of losing important information and increasing the possibility of removing redundant information compared to local pruning techniques.

A conventional global pruning technique uses a spectral norm to determine the global pruning ratio. However, the conventional methodology had a limitation in that the calculation costs for calculating the spectrum norm were large when the size of the deep neural network was relatively large. This resulted in inefficiency in which the calculation costs increased significantly in environments where the scale and computational complexity of recently proposed deep neural network models are rapidly increasing.

Accordingly, there is a need for technology development and research on a method of compressing a neural network model to calculate a pruning ratio at a low calculation cost and a device for performing the same.

SUMMARY

The problem the present invention aims to solve is to provide a method of compressing a neural network model to minimize a performance loss while solving a calculation cost problem, and/or a device for performing the same.

The problem the present invention aims to solve is a method of compressing a neural network model to maximize performance of object recognition according to a size of an object included in a data set, a method of recognizing an object using a compressed neural network model, and/or a device for performing the same.

Problems to be solved by the present invention are not limited to the above-described objects, and objects that are not mentioned will be clearly understood by those skilled in the art to which the present invention pertains from the present specification and the accompanying drawings.

According to an embodiment of the present application, a method of compressing a neural network model for object recognition includes: receiving an original model for object recognition trained based on a first data set; receiving a second data set of an analysis target; calculating object size information on sizes of objects included in an image of the second data set; performing pruning on at least one layer included in the original model based on the calculated object size information; and generating a compressed neural network model from the original model based on the results of performing the pruning.

According to another embodiment of the present application, an electronic device includes: a transceiver configured to receive an original model for object recognition on which training is completed; and a processor configured to perform compressing on the original model, in which the processor may be configured to receive an original model for object recognition trained based on a first data set, receive a second data set of an analysis target, calculate object size information on sizes of objects included in an image of the second data set, perform pruning on at least one layer included in the original model based on the calculated object size information, and generate a compressed neural network model from the original model based on the results of performing the pruning.

According to another embodiment of the present application, an object recognition method includes: receiving a data set to be analyzed; and inputting the received data set to a compressed neural network model to generate an output value corresponding to a value identifying an object included in an image of the data set, in which the compressed neural network model may be compressed from an original model using pruning ratios for each layer determined based on ratios for each size of objects included in the image of the data set.

According to another embodiment of the present application, an electronic device includes a transceiver configured to receive a data set to be analyzed; and a processor configured to recognize an object included in the data set, in which the processor may be configured to receive the data set and input the received data set to a compressed neural network model to generate an output value corresponding to a value identifying an object included in an image of the data set, and the compressed neural network model may be compressed from an original model using pruning ratios for each layer determined based on ratios for each size of objects included in the image of the data set.

Technical solutions of the present invention are not limited to the above-described solutions, and solutions that are not mentioned will be clearly understood by those skilled in the art to which the present invention pertains from the present specification and the accompanying drawings.

DESCRIPTION OF EXAMPLE EMBODIMENTS

Figure 1:
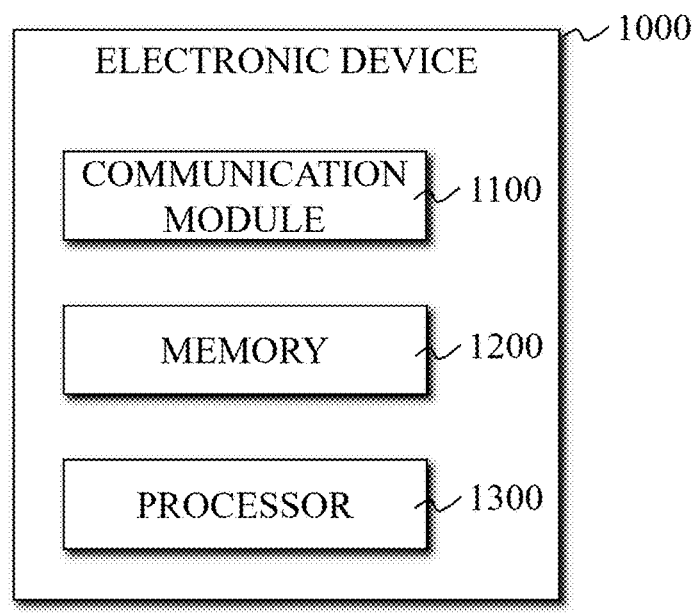
FIG. 1 is a schematic diagram illustrating an electronic device according to an embodiment of the present application.

Objects, features, and advantages of the present application will become more obvious from the following detailed description provided in relation to the accompanying drawings. However, the present application may be variously modified and have several exemplary embodiments. Hereinafter, specific exemplary embodiments will be illustrated in the accompanying drawings and described in detail.

The same reference numerals denote the same constituent elements throughout the specification. Further, elements having the same function within the scope of the same idea illustrated in the drawings of each embodiment will be described using the same reference numerals, and overlapping descriptions thereof will be omitted.

When it is determined that a detailed description of known functions or configurations related to the present application may obscure the gist of the present application, detailed descriptions thereof will be omitted. In addition, numbers (for example, "first," "second," etc.) used in the description process of the present specification are only identification symbols for distinguishing one component from other components.

In addition, suffixes "module" and "unit" for components used in the following embodiments are used only in order to easily make the disclosure. Therefore, these terms do not have meanings or roles that distinguish them from each other in themselves.

Singular forms are intended to include plural forms unless the context clearly indicates otherwise.

In the following embodiments, the terms "include," "have," or the like mean that a feature or element described in the specification is present, and do not preclude in advance the possibility that one or more other features or components may be added.

Sizes of components may be exaggerated or reduced in the accompanying drawings for convenience of explanation. For example, the size and thickness of each component illustrated in the drawings are randomly indicated for convenience of description, and the present invention is not necessarily limited to those illustrated.

In a case where certain embodiments can be otherwise implemented, the order of specific processes may be performed different from the order in which the processes are described. For example, two processes described in succession may be performed substantially simultaneously, or may be performed in an order opposite to the order described.

In the following embodiments, when components are connected, it includes not only a case where the components are directly connected but also a case where the components are indirectly connected via a certain component interposed between the components. For example, in the present specification, when components and the like are electrically connected, it includes not only a case where the components are directly electrically connected, but also a case where the components are indirectly electrically connected via a certain component interposed between the components.

According to an embodiment of the present application, a method of compressing a neural network model for object recognition includes: receiving an original model for object recognition trained based on a first data set; receiving a second data set of an analysis target; calculating object size information on sizes of objects included in an image of the second data set; performing pruning on at least one layer included in the original model based on the calculated object size information; and generating a compressed neural network model from the original model based on the results of performing the pruning.

According to an embodiment of the present application, the object size information may include information on a first ratio of first objects corresponding to a first size range included in the image and a second ratio of second objects corresponding to a second size range included in the image.

According to an embodiment of the present application, the calculating of the object size information may include: when the number of pixels corresponding to the object is greater than or equal to the predetermined number of reference pixels, classifying the object as the first object corresponding to the first size range, and when the number of pixels corresponding to the object is smaller than the number of reference pixels, classifying the object as the second object corresponding to the second size range; and calculating the object size information based on the number of objects classified as the first object and the number of objects classified as the second object.

According to an embodiment of the present application, the performing of the pruning may further include: receiving first graph information indicating sensitivity of the original model to the pruning ratio corresponding to the first size range and second graph information indicating the sensitivity of the original model relative to the pruning ratio corresponding to the second size range; calculating a first target performance value for the first size range based on the first ratio, and calculating a second target performance value for the second size range based on the second ratio; calculating an optimized pruning ratio for the layer based on the first target performance value and the first graph information, and the second target performance value and the second graph information; and performing the pruning on the layer based on the optimized pruning ratio.

According to an embodiment of the present application, the first graph information and the second graph information may be generated during the pruning after training of the original model using the first data set is completed.

According to an embodiment of the present application, when the first ratio is smaller than the second ratio, the first target performance value may be calculated as a higher value than the second target performance value.

According to an embodiment of the present application, the calculating of the optimized pruning ratio for the layer may further include: calculating a first maximum performance value from the first graph information and a second maximum performance value from the second graph information; calculating a first weight based on a difference between the first maximum performance value and the first target performance value, and calculating a second weight based on a difference between the second maximum performance value and the second target performance value; and calculating the optimized pruning ratio based on the first weight and the second weight.

According to an embodiment of the present application, the calculating of the optimized pruning ratio may further include: calculating a first pruning ratio corresponding to the first target performance value from the first graph information and calculating a second pruning ratio corresponding to the second target performance value from the second graph information; calculating an adjusted first pruning ratio by assigning the first weight to the first pruning ratio, and calculating an adjusted second pruning ratio by assigning the second weight to the second pruning ratio; and calculating the optimized pruning ratio based on the adjusted first pruning ratio or the adjusted second pruning ratio.

According to an embodiment of the present application, the original model may include a first layer and a second layer located between an input layer and an output layer of the original model, the first layer may be located relatively closer to the input layer than the second layer, and the performing of the pruning on the at least one layer included in the original model may further include calculating a first optimized pruning ratio for the first layer and performing the pruning on the first layer based on the first optimized pruning ratio; and calculating a second optimized pruning ratio for the second layer and performing the pruning on the second layer based on the second optimized pruning ratio.

According to an embodiment of the present application, a computer-readable recording medium in which a program for executing the method of compressing a neural network model is recorded may be provided.

According to an embodiment of the present application, an electronic device includes: a transceiver configured to receive an original model for object recognition on which training is completed; and a processor configured to perform compressing on the original model, in which the processor may be configured to receive an original model for object recognition trained based on a first data set, receive a second data set of an analysis target, calculate object size information on sizes of objects included in an image of the second data set, perform pruning on at least one layer included in an original model based on the calculated object size information, and generate a compressed neural network model from the original model based on the results of performing the pruning.

According to an embodiment of the present application, a method of recognizing an object includes: receiving a data set to be analyzed; and inputting the received data set to a compressed neural network model to generate an output value corresponding to a value identifying an object included in an image of the data set, in which the compressed neural network model may be compressed from the original model using pruning ratios for each layer determined based on ratios for each size of objects included in the image of the data set.

According to an embodiment of the present application, the original model may be a model pre-trained using a data set different from the data set, and the pruning ratios for each layer may be determined by applying a target performance value calculated for each size of the object from ratios for each size of the data set to pruning sensitivity information for each layer of the original model calculated for each size of the object using the other data set.

According to an embodiment of the present application, the pruning ratio for each layer may be determined by applying the target performance value to the pruning sensitivity information and weight-summing a candidate pruning ratio determined for each size with a different weight for each size, and the weight may be determined to be larger as performance decline rates for each size determined based on the pruning sensitivity information and the target performance value increase.

According to an embodiment of the present application, the performance decline rate may be defined based on a difference between a maximum performance value calculated from the pruning sensitivity information and the target performance value, and the candidate pruning ratio.

According to an embodiment of the present application, the ratios for each size may include a first ratio of first objects corresponding to a first size range included in the data set and a second ratio corresponding to a second size range included in the data set, and when the first ratio is smaller than the second ratio, the target performance value determined for the first layer related to the first ratio may be determined to be larger than the target performance value determined for the second layer related to the second ratio.

According to an embodiment of the present application, the ratios for each size may be calculated based on the number of objects corresponding to the first size range and the number of objects corresponding to the second size range classified based on the number of pixels corresponding to the objects in the data set and the predetermined number of reference pixels.

According to an embodiment of the present application, a computer-readable recording medium in which a program for a method of recognizing an object is recorded may be provided.

According to another embodiment of the present application, an electronic device includes a transceiver configured to receive a data set to be analyzed; and a processor configured to recognize an object included in the data set, in which the processor may be configured to receive the data set and input the received data set to a compressed neural network model to generate an output value corresponding to a value identifying an object included in an image of the data set, and the compressed neural network model may be compressed from an original model using pruning ratios for each layer determined based on ratios for each size of objects included in the image of the data set.

Hereinafter, with reference to FIGS. 1 to 11, a method of compressing a neural network model for object recognition, a method of object recognition using a compressed neural network model, and/or a device (hereinafter referred to as an electronic device) for performing the same according to an embodiment of the present application will be described in more detail.

According to an embodiment, an electronic device 1000 may perform an operation of compressing a neural network model for object recognition. Specifically, the electronic device 1000 may perform an operation of compressing a pre-trained neural network model for object recognition in consideration of a size of an object included in a data set.

According to an embodiment, the electronic device 1000 may perform an operation of recognizing an object included in a data set to be analyzed using a compressed neural network model. Specifically, the electronic device 1000 may perform an operation of acquiring an output value corresponding to a value identifying the object included in the data set to be analyzed by inputting the data set to be analyzed to the compressed neural network model in consideration of the size of the object included in the data set.

The electronic device 1000 may be any type of server, personal computer (PC), tablet PC, smartphone, smartwatch, personal digital assistant (PDA), and/or a combination thereof. Furthermore, the meaning of the electronic device 1000 may encompass a combination of at least one or more servers.

Meanwhile, in FIG. 1, it is described that the single electronic device 1000 performs an operation of compressing the neural network model and an operation of recognizing the object using the compressed neural network model. However, this is only for convenience of description, and the device that performs an operation of compressing the neural network model and the device that performs an operation of recognizing the object may be configured separately.

FIG. 1 is a schematic diagram illustrating an electronic device according to an embodiment of the present application.

The electronic device 1000 may include a communication module 1100 (which may also be referred to as a transceiver unit), a memory 1200, and/or a processor 1300.

The communication module 1100 of the electronic device 1000 may communicate with any external device or external server. As an example, the electronic device 1000 may acquire arbitrary data (e.g., structural information of the original model, an operation library, weight information of the original model, etc.) for executing a pre-trained original model through the communication module 1100. For example, the electronic device 1000 may acquire a data set for compressing and/or a data set for object recognition through the communication module 1100. As an example, the electronic device 1000 may transmit, through the communication module 1100, an output value corresponding to a value identifying an object included in a data set acquired using a compressed neural network model. However, this is only an example, and the electronic device 1000 may transmit and receive any appropriate data and/or commands to and from any component through the communication module 1100.

The electronic device 1000 may access a network to transmit/receive various types of data through the communication module 1100. The communication module 1100 may largely include a wired type and a wireless type. Since the wired type and the wireless type have their respective strengths and weaknesses, in some cases, the wired type and the wireless type may be simultaneously provided in the electronic device 1000. Here, in the case of the wireless type, a wireless local area network (WLAN)-based communication method such as Wi-Fi may be mainly used. Alternatively, in the case of the wireless type, cellular communication, for example, a Long Term Evolution (LTE)- and 5G-based communication method may be used. However, the wireless communication protocol is not limited to the above-described example, and any suitable wireless type communication method may be used. In the case of the wired type, local area network (LAN) or Universal Serial Bus (USB) communication is a representative example, and other methods are also possible.

The memory 1200 of the electronic device 1000 may store various types of information. Various types of data may be temporarily or semi-permanently stored in the memory 1200. An example of the memory 1200 may include a hard disk drive (HDD), a solid state drive (SSD), a flash memory, a read-only memory (ROM), a random access memory (RAM), or the like. The memory 1200 may be provided in a form embedded in the electronic device 1000 or in a form attached to or detached from the electronic device 1000. The memory 1200 may store various types of data necessary for an operation of the electronic device 1000 in addition to an operating system (OS) for driving the electronic device 1000 or a program for operating each component of the electronic device 1000.

The processor 1300 may control the overall operation of the electronic device 1000. For example, the processor 1300 may include an operation P1 of compressing a pre-trained original model, which will be described later, and/or an operation P2 of recognizing an object included in a target data set using the compressed neural network model, etc., to control the overall operation of the electronic device 1000. Specifically, the processor 1300 may load and execute a program for the overall operation of the electronic device 1000 from the memory 1200. The processor 1300 may be implemented as an application processor (AP), a central processing unit (CPU), a microcontroller unit (MCU), or similar devices thereto according to hardware, software, or a combination thereof. In this case, the processor may be provided with an electronic circuit form processing an electrical signal to perform a control function in terms of hardware, and may be provided with a program or code form driving the hardware circuit in terms of software.

Figure 2:
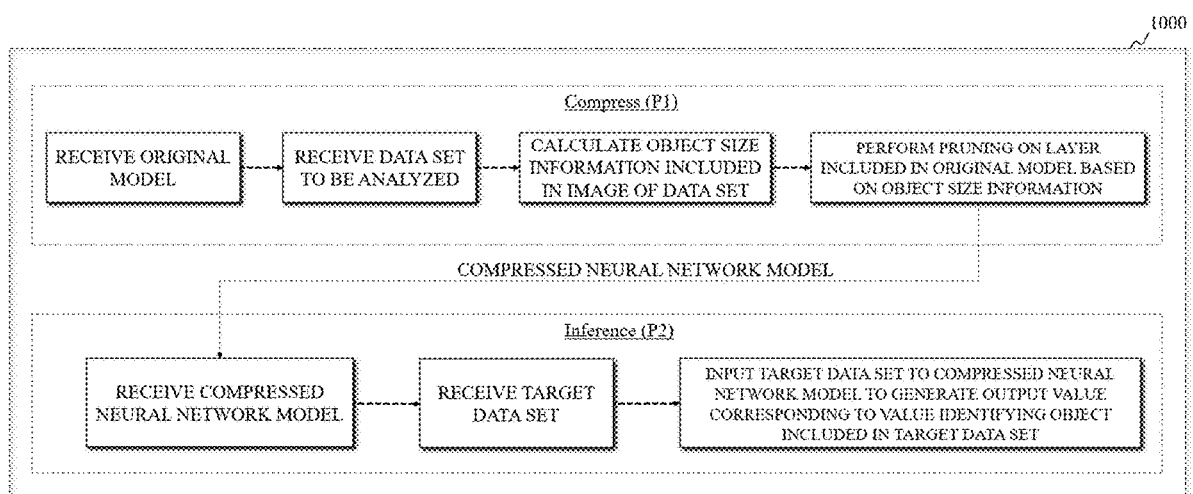
FIG. 2 is a diagram for describing operations performed by an electronic device according to an embodiment of the present application.

FIG. 2 is a diagram for describing the operations performed by the electronic device 1000 according to an embodiment of the present application.

According to an embodiment of the present application, the electronic device 1000 may perform the operation P1 of compressing an original neural network model for object recognition. Specifically, the electronic device 1000 may perform pruning on at least one layer included in the original neural network model in consideration of the ratios for each size of objects in an image included in the data set.

The electronic device 1000 may perform an operation of receiving the pre-trained original model through the communication module 1100. Receiving the original model may mean receiving arbitrary data (e.g., structural information of the original model, operation library, and/or weight information of the original model) to appropriately execute the original model. The original model may be pre-trained based on the first data set.

Furthermore, the electronic device 1000 may perform an operation of receiving the data set to be analyzed through the communication module 1100. The data set may be in the form of the image, and the data set may include an area corresponding to at least one object included in the image. Furthermore, the data set (hereinafter referred to as the second data set) to be analyzed may be at least partially different from a first data set for training the original model.

The electronic device 1000 may perform an operation of calculating object size information on the size of at least one object included in the image of the second data set. The object size information includes a first ratio of first objects corresponding to a first size range (e.g., a large size range) included in the image of the second data set, a second ratio of second objects corresponding to a second size range (e.g., a medium size range) included in the image of the second data set, and/or a third ratio of third objects corresponding to a third size range (e.g., a small size range) included in the image of the second data set.

The electronic device 1000 may perform pruning on layers included in the original model based on the object size information. Specifically, the electronic device 1000 may perform an operation of compressing the original model by calculating an optimized pruning ratio for at least one layer included in the original model based on the ratios for each object size included in the image of the second data set and performing the pruning on the layers included in the original model based on the calculated optimized pruning ratio. Furthermore, the electronic device 1000 may generate the compressed neural network model based on the optimized pruning ratio.

Compressing the original neural network model for object recognition will be described in more detail with reference to FIGS. 3 to 9.

The electronic device 1000 according to an embodiment of the present application may perform an operation P2 of recognizing an object included in an image of a target data set to be analyzed using the compressed neural network model.

The electronic device 1000 may perform an operation of receiving the compressed neural network model through the communication module 1100 by the above-described operation P1. Receiving the compressed neural network model may mean receiving arbitrary data (e.g., structural information of the original model, operation library, and/or weight information of the original model) to appropriately execute the compressed neural network model.

Furthermore, the electronic device 1000 may perform an operation of receiving the target data set for object recognition through the communication module 1100. The target data set may be in the form of the image, and the target data set may include an area corresponding to at least one object included in the image.

The electronic device 1000 may perform an operation of generating an output value corresponding to a value identifying an object included in the target data set by inputting the target data set to the compressed neural network model. Specifically, the electronic device 1000 may input the image of the target data set to the input layer of the compressed neural network model, and calculate the output value corresponding to the value identifying the object included in the target data set calculated by layer information and/or weight information of the compressed neural network model through the output layer of the compressed neural network model.

Figure 10:
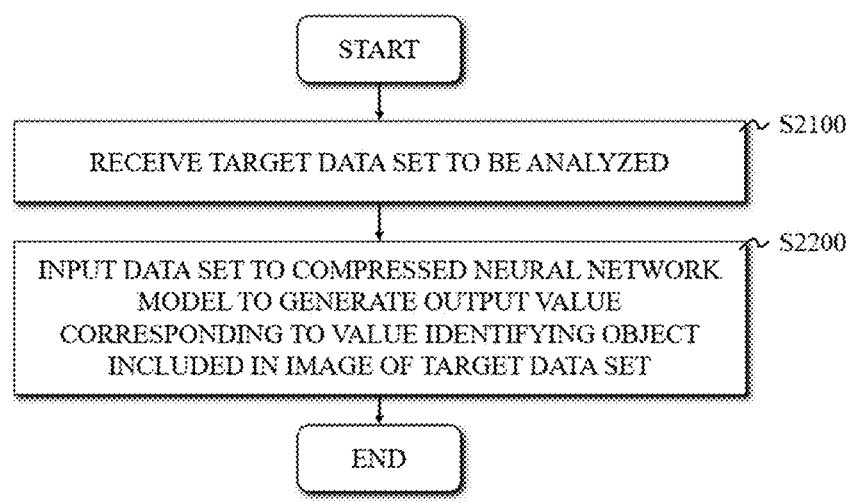
FIG. 10 is a flowchart illustrating a method of recognizing an object included in a data set using a compressed neural network model according to an embodiment of the present application.
Figure 11:
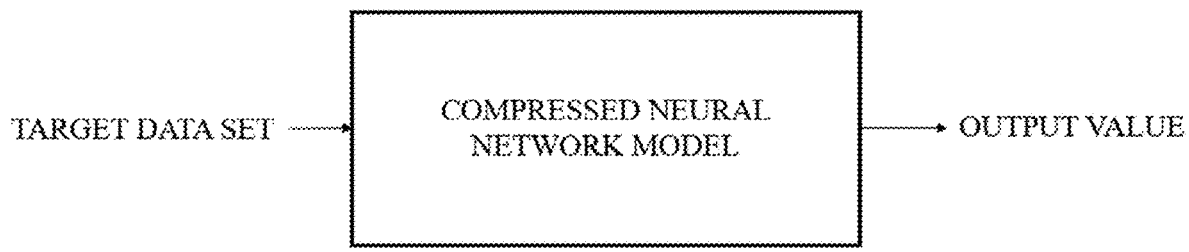
FIG. 11 is a diagram for describing an aspect of recognizing an object included in a data set using a compressed neural network model according to an embodiment of the present application.

The object recognition using the compressed neural network model will be described in more detail with reference to FIGS. 10 and 11.

Hereinafter, the method of compressing a neural network model for object recognition, and the method of recognizing an object using a compressed neural network model according to an embodiment of the present application will be described in more detail with reference to FIGS. 3 to 11. Specifically, the method of compressing a neural network model for object recognition according to an embodiment of the present application will be described with reference to FIGS. 3 to 9. Furthermore, the method of recognizing an object using a compressed neural network model according to an embodiment of the present application will be described with reference to FIGS. 10 and 11. Meanwhile, in describing the method of compressing a neural network model for object recognition, and the method of recognizing an object using a compressed neural network model, some embodiments that overlap with the content previously described with reference to FIGS. 1 and 2 may be omitted. However, this is only for convenience of description and should not be construed as limiting.

Figure 3:
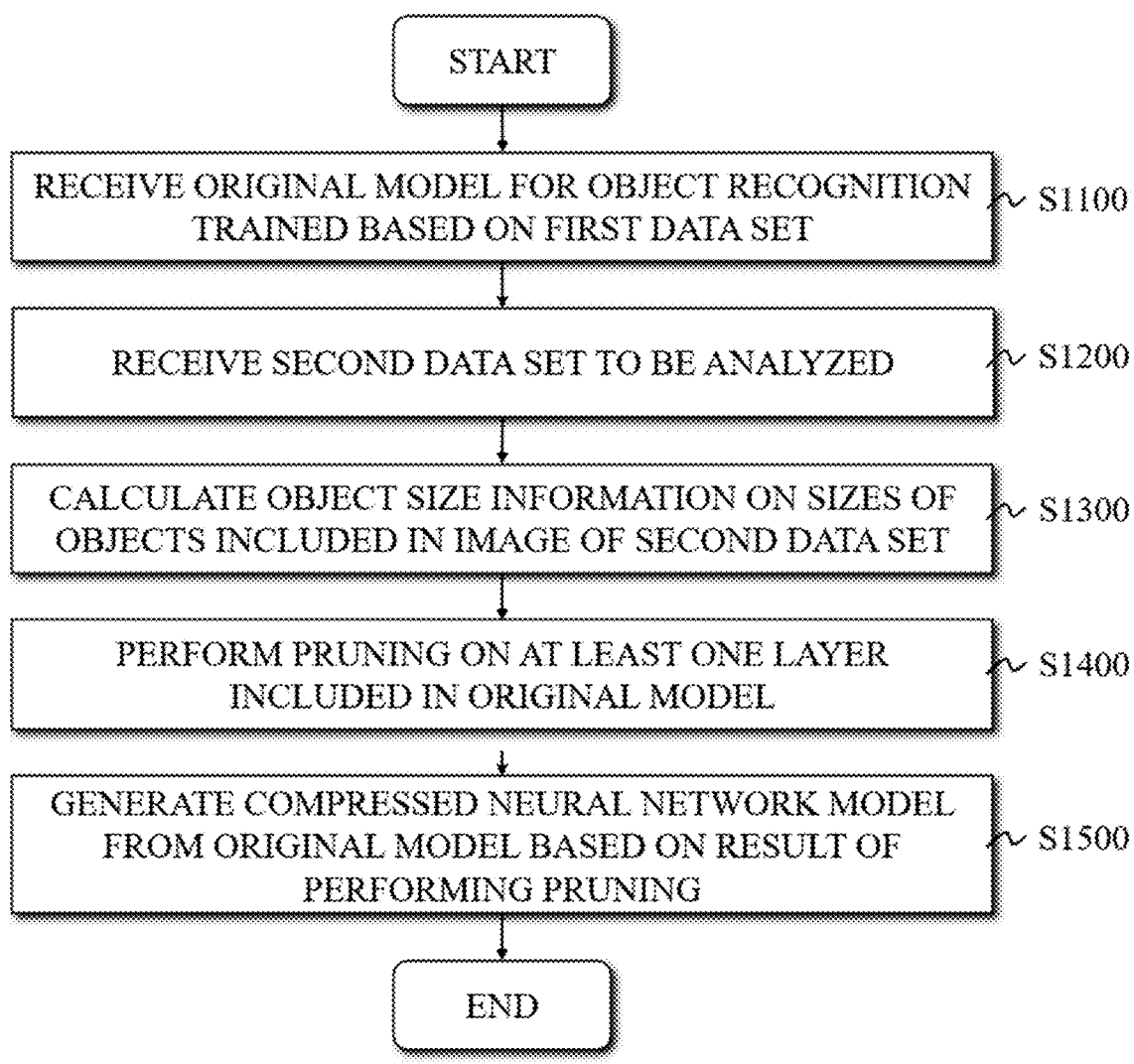
FIG. 3 is a flowchart illustrating a method of compressing a neural network model for object recognition according to an embodiment of the present application.

FIG. 3 is a flowchart illustrating a method of compressing a neural network model for object recognition according to an embodiment of the present application.

The method of compressing a neural network model for object recognition according to an embodiment of the present application includes: receiving an original model for object recognition trained based on a first data set (S1100); receiving a second data set of an analysis target (S1200); calculating object size information on sizes of objects included in an image of the second data set (S1300); performing pruning on at least one layer included in the original model (S1400); and/or generating a compressed neural network model from the original model based on the results of performing the pruning (S1500).

In the operation (S1100) of receiving the original model for object recognition trained based on the first data set, the electronic device 1000 may receive the original model for object recognition pre-trained based on the first data set through the communication module 1100. Receiving the original model may mean acquiring arbitrary data (e.g., structural information of the original model, operation library, and/or weight information of the original model) to appropriately execute the original model. Meanwhile, the original model may be a yolo series neural network model, and/or a RetinaNet series neural network model, but is not limited thereto. Meanwhile, the first data set may be the COCO data set, but is not limited thereto.

In the operation (S1200) of receiving the second data set to be analyzed (S1200), the electronic device 1000 may receive the second data set of the analysis target through the communication module 1100. The second data set (and/or the first data set) may be in the form of the image, and the second data set may include an area corresponding to at least one object included in the image. Meanwhile, the second data set may be at least partially different from the first data set for training the original model.

In the operation (S1300) of calculating the object size information on the sizes of the objects included in the image of the second data set, the electronic device 1000 may calculate the object size information on the sizes of at least one object included in the image of the second data set received through operation S1200. The object size information may include ratios for each size of objects included in the image of the second data set. For example, the object size information includes a first ratio of first objects corresponding to a first size range (e.g., a large size range) included in the image of the second data set, a second ratio of second objects corresponding to a second size range (e.g., a medium size range) included in the image of the second data set, and/or a third ratio of third objects corresponding to a third size range (e.g., a small size range) included in the image of the second data set.

Figure 4:
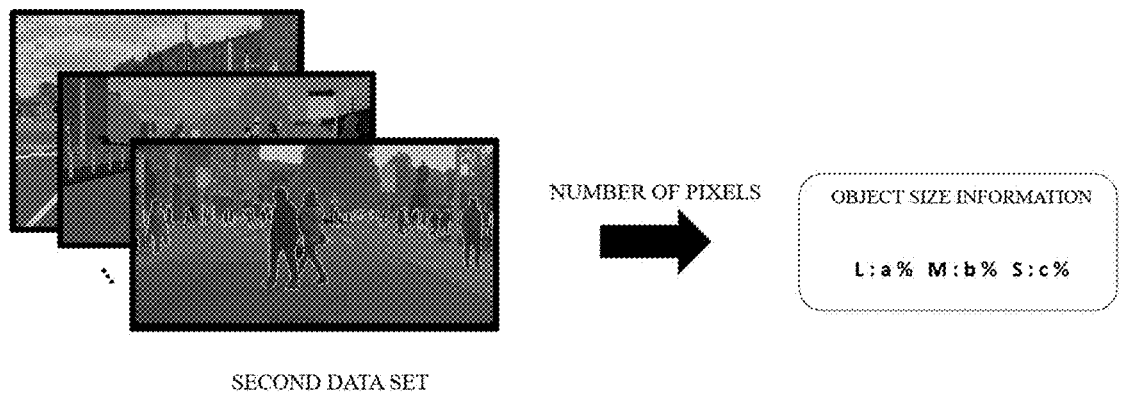
FIG. 4 is a diagram for describing an aspect of calculating object size information according to an embodiment of the present application.

FIG. 4 is a diagram for describing an aspect of calculating the object size information according to an embodiment of the present application.

The electronic device 1000 according to an embodiment of the present application may calculate the object size information based on the number of pixels corresponding to the objects of the image included in the second data set.

For example, the information on the size range of pixels of the object area included in the image may be assigned to the second data set. For example, information indicating that the size of the object falls within the first size range may be assigned to pixels included in the area corresponding to the first objects whose size falls within the first size range. For example, information indicating that the size of the object falls within the second size range may be assigned to pixels included in the area corresponding to the second objects whose size falls within the second size range. For example, information indicating that the size of the object falls within the third size range may be assigned to pixels included in the area corresponding to the third objects whose size falls within the third size range. In this case, the electronic device 1000 may calculate, based on the information assigned to the pixels, the number of first pixels corresponding to the first objects corresponding to the first size range (e.g., the large size range) included in the image of the second data set, the number of second pixels corresponding to the second objects corresponding to the second size range (e.g., the medium size range) included in the image of the second data set, and/or the number of third pixels corresponding to the third objects corresponding to the third size range (e.g., the small size range) included in the image of the second data set. Furthermore, the electronic device 1000 may calculate the object size information based on the number of first to third pixels. For example, the electronic device 1000 may calculate the object size information including the first ratio (e.g., a % in FIG. 4) of the first objects corresponding to the first size range (e.g., L in FIG. 4) based on the number of first pixels relative to the sum of the number of first to third pixels. For example, the electronic device 1000 may calculate the object size information including the second ratio (e.g., b % in FIG. 4) of the second objects corresponding to the second size range (e.g., M in FIG. 4) based on the number of second pixels relative to the sum of the number of first to third pixels. For example, the electronic device 1000 may calculate the object size information including the third ratio (e.g., c % in FIG. 4) of the third objects corresponding to the third size range (e.g., S in FIG. 4) based on the number of third pixels relative to the sum of the number of first to third pixels.

As an example, the electronic device 1000 may calculate the object size information based on the number of pixels included in the area corresponding to the object included in the second data set and the predetermined number of reference pixels. For example, when the number of pixels included in the area corresponding to the object included in the second data set is greater than or equal to the predetermined number of first reference pixels, the electronic device 1000 may classify the object as the first object corresponding to the first size range (e.g., L in FIG. 4). For example, when the number of pixels included in the area correspond-ing to the object included in the second data set is smaller than the predetermined number of first reference pixels and is greater than or equal to the predetermined number of second pixels, the electronic device 1000 may classify the object as the second object corresponding to the second size range (e.g., M in FIG. 4). For example, when the number of pixels included in the area corresponding to the object included in the second data set is smaller than the predetermined number of second reference pixels, the electronic device 1000 may classify the object as the third object corresponding to the third size range (e.g., S in FIG. 4). In this case, the electronic device 1000 may calculate the object size information based on the classification result of the object. For example, the electronic device 1000 may calculate the object size information including the first ratio (e.g., a % in FIG. 4) of the first objects corresponding to the first size range based on the number of first objects classified into the first size range relative to the number of first to third objects. For example, the electronic device 1000 may calculate the object size information including the second ratio (e.g., b % in FIG. 4) of the second objects corresponding to the second size range based on the number of second objects classified into the second size range relative to the number of first to third objects. For example, the electronic device 1000 may calculate the object size information including the third ratio (e.g., c % in FIG. 4) of the third objects corresponding to the third size range based on the number of third objects classified into the third size range relative to the number of first to third objects.

However, this is only an example, and the electronic device 1000 may be implemented to calculate the ratio of each object size included in the image included in the second data set using any appropriate method.

In the operation (S1400) of performing pruning on at least one layer included in the original model, the electronic device 1000 may perform the pruning on at least one layer included in the original model based on the object size information on the ratios for each object size included in the image of the second data set calculated through operation S1300. Specifically, the electronic device 1000 may perform an operation of compressing the original model by calculating an optimized pruning ratio for at least one layer included in the original model based on the ratios for each object size included in the image of the second data set and performing the pruning on the layers included in the original model based on the calculated optimized pruning ratio.

Figure 5:
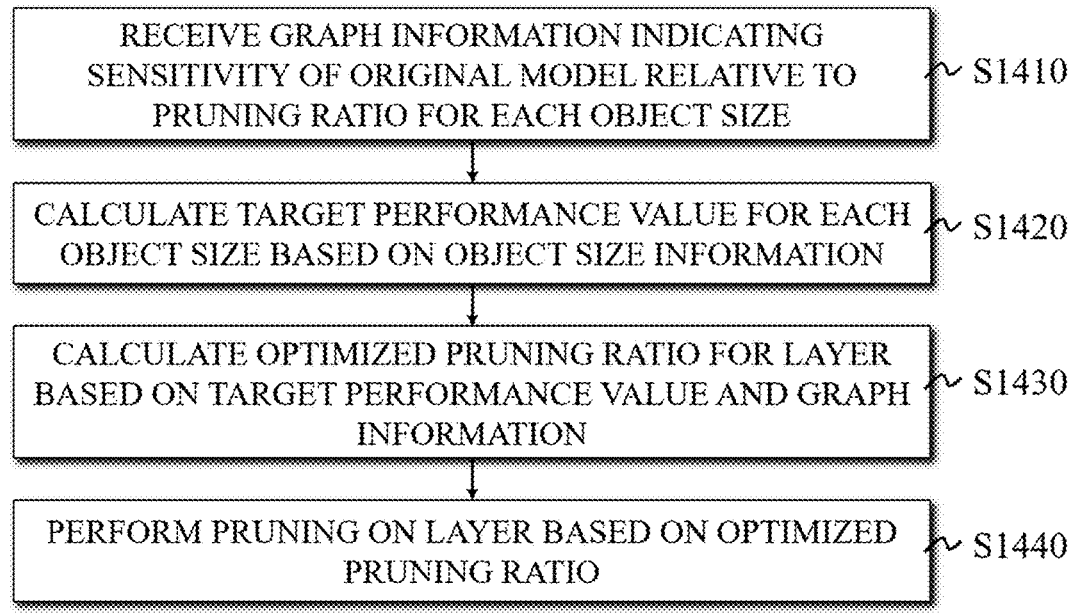
FIG. 5 is a flowchart specifying an operation of performing pruning on at least one layer included in the original model according to an embodiment of the present application.

FIG. 5 is a flowchart specifying the operation (S1400) of performing the pruning on at least one layer included in the original model according to an embodiment of the present application.

The performing of the pruning (S1400) on at least one layer included in the original model according to an embodiment of the present application may further include receiving the graph information indicating the sensitivity of the original model relative to the pruning ratios for each object size (S1410), calculating the target performance values for each object size based on the object size information (S1420), calculating the optimized pruning ratio for the layer based on the target performance value and the graph information (S1430), and/or performing the pruning on the layer based on the optimized pruning ratio (S1440).

In the operation (S1410) of receiving the graph information (or pruning sensitivity information, hereinafter referred to as the graph information) indicating the sensitivity of the original model relative to the pruning ratios for each object size, the electronic device 1000 may receive first graph information indicating the sensitivity of the original model according to the pruning ratio to the first size range, second graph information indicating the sensitivity of the original model according to the pruning ratio for the second size range, and/or third graph information indicating the sensitivity of the original model according to the pruning ratio for the third size range.

Figure 6:
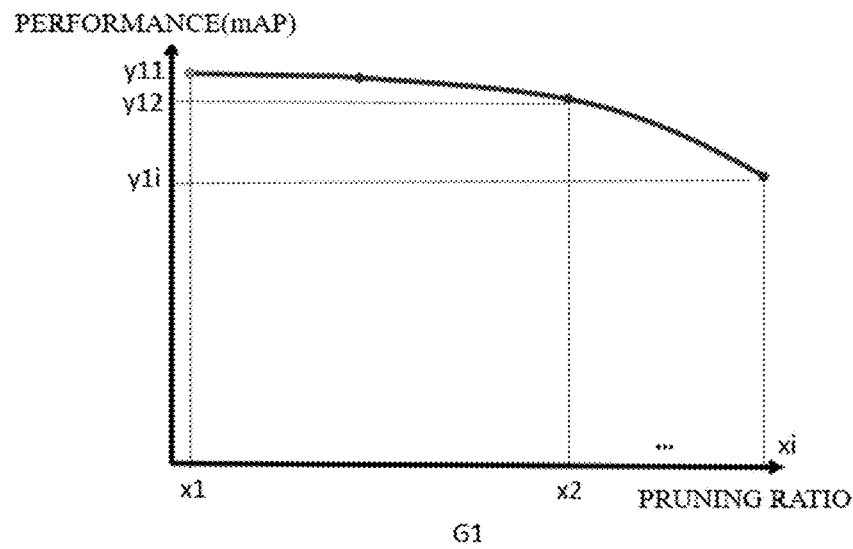
FIG. 6 is a diagram for describing an aspect of graph information indicating sensitivity of the original model relative to a pruning ratio according to an embodiment of the present application.
Figure 6:
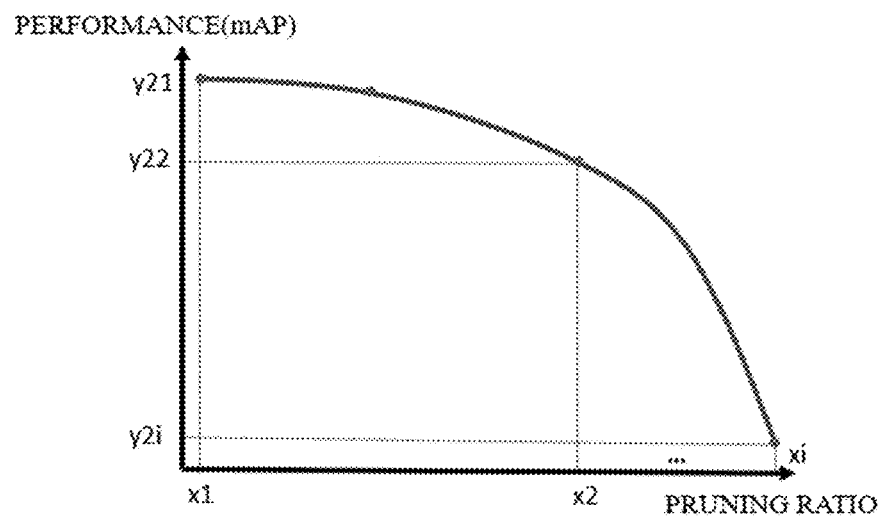
Figure 6:
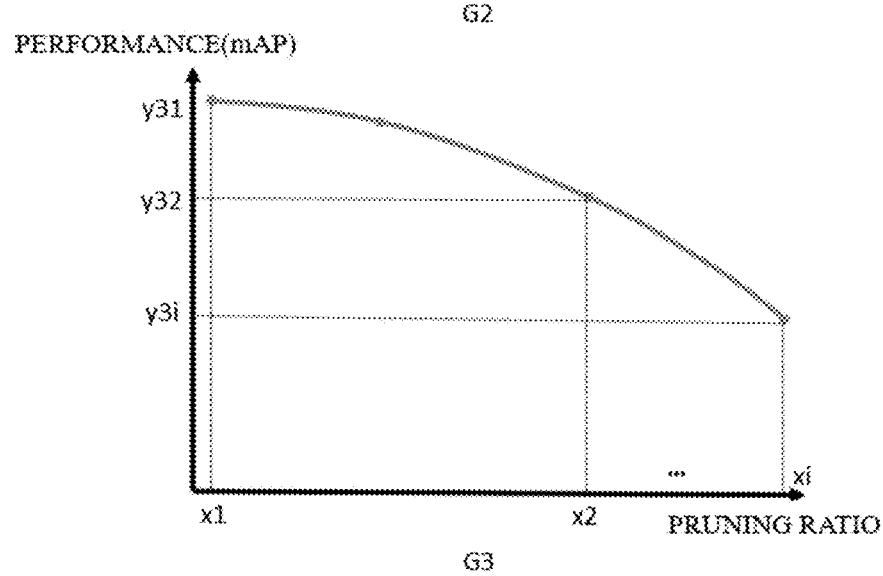

FIG. 6 is a diagram for describing an aspect of graph information indicating sensitivity of the original model relative to a pruning ratio according to an embodiment of the present application.

The graph information indicating the sensitivity of the original model according to the pruning ratio may be generated during the pruning after the training of the original model using the first data set is completed.

Specifically, the electronic device 1000 may be configured to prune at least one layer included in the original model at a first pruning ratio (e.g., x1 in FIG. 6). In this case, the electronic device 1000 may input the image including the object corresponding to the first size range to the original model including the layer pruned at the first pruning ratio, and acquire the performance (e.g., y11 in FIG. 6) of the pruned original model corresponding to the first pruning ratio. Furthermore, the electronic device 1000 may input the image including the object corresponding to the second size range to the original model including the layer pruned at the first pruning ratio, and acquire the performance (e.g., y21 in FIG. 6) of the pruned original model corresponding to the first pruning ratio. Furthermore, the electronic device 1000 may input the image including the object corresponding to the third size range to the original model including the layer pruned at the first pruning ratio, and acquire the performance (e.g., y31 in FIG. 6) of the pruned original model corresponding to the first pruning ratio.

Similarly, the electronic device 1000 may be configured to prune at least one layer included in the original model at a second pruning ratio (e.g., x2 in FIG. 6). In this case, the electronic device 1000 may input the image including the object corresponding to the first size range to the original model including the layer pruned at the second pruning ratio, and acquire the performance (e.g., y12 in FIG. 6) of the pruned original model corresponding to the second pruning ratio. Furthermore, the electronic device 1000 may input the image including the object corresponding to the second size range to the original model including the layer pruned at the second pruning ratio, and acquire the performance (e.g., y22 in FIG. 6) of the pruned original model corresponding to the second pruning ratio. Furthermore, the electronic device 1000 may input the image including the object corresponding to the third size range to the original model including the layer pruned at the second pruning ratio, and acquire the performance (e.g., y32 in FIG. 6) of the pruned original model corresponding to the second pruning ratio.

Similarly, the electronic device 1000 may be configured to prune at least one layer included in the original model at an ith pruning ratio (e.g., xi in FIG. 6). In this case, the electronic device 1000 may input the image including the object corresponding to the first size range to the original model including the layer pruned at the ith pruning ratio, and acquire the performance (e.g., y1$i$ in FIG. 6) of the pruned original model corresponding to the ith pruning ratio. Furthermore, the electronic device 1000 may input the image including the object corresponding to the second size range to the original model including the layer pruned at the ith pruning ratio, and acquire the performance (e.g., y2$i$ in FIG. 6) of the pruned original model corresponding to the ith pruning ratio. Furthermore, the electronic device 1000 may input the image including the object corresponding to the third size range to the original model including the layer pruned at the ith pruning ratio, and acquire the performance (e.g., y3$i$ in FIG. 6) of the pruned original model corresponding to the ith pruning ratio.

In this case, the electronic device 1000 may receive the graph information indicating the sensitivity of the original model relative to the pruning ratio based on each pruning ratio, and the performance value of the pruned original model corresponding to each pruning ratio. For example, the electronic device 1000 may receive first graph information (e.g., G1 in FIG. 6) indicating the sensitivity of the original model relative to the pruning ratio for the first size range (e.g., the large size range) based on each pruning ratio (e.g., x1, x2, to xi in FIG. 6) and performance values (e.g., y11, y12, to y1$i$) corresponding to each pruning ratio. For example, the electronic device 1000 may receive second graph information (e.g., G2 in FIG. 6) indicating the sensitivity of the original model relative to the pruning ratio for the second size range (e.g., the medium size range) based on each pruning ratio (e.g., x1, x2, to xi in FIG. 6) and performance values (e.g., y21, y22, to y2$i$) corresponding to each pruning ratio. For example, the electronic device 1000 may receive third graph information (e.g., G3 in FIG. 6) indicating the sensitivity of the original model relative to the pruning ratio for the third size range (e.g., the small size range) based on each pruning ratio (e.g., x1, x2, to xi in FIG. 6) and performance values (e.g., y31, y32, to y3$i$) corresponding to each pruning ratio.

In the operation (S1420) of calculating the target performance values for each object size based on the object size information, the electronic device 1000 may be configured to calculate the target performance values for each object size based on the object size information calculated in operation S1300. Specifically, the electronic device 1000 may calculate a first target performance value related to the first size range based on the first ratio corresponding to the first size range (e.g., the large size range) calculated in operation S1300, calculate a second target performance value related to the second size range based on the second ratio corresponding to the second size range (e.g., the medium size range) calculated in operation S1300, and calculate a third target performance value related to the third size range based on the third ratio corresponding to the third size range (e.g., the small size range) calculated in operation S1300.

According to an embodiment of the present application, the electronic device 1000 may be implemented to assign a relatively high target performance value relative to the size of the object with a relatively low ratio. For example, when the first ratio corresponding to the first size range is smaller than the second ratio corresponding to the second size range, the electronic device 1000 may be implemented to calculate the first target performance value for the first size range as a higher value than the second target performance value for the second size range. For example, when the second ratio corresponding to the second size range is greater than the third ratio corresponding to the third size range, the electronic device 1000 may be implemented to calculate the second target performance value for the second size range as a lower value than the third target performance value for the third size range.

According to an embodiment of the present application, the electronic device 1000 may be implemented to calculate the target performance value from the object size information using Equation 1 below.

Target performance value =            Equation 1

(1 − object size ratio) ∗ maximum performance value

For example, it is assumed that the object size information is calculated to include the first ratio (e.g., 0.1) for the first size range, the second ratio (e.g., 0.6) for the second size range, and/or the third ratio (e.g., 0.3) for the third size range. In this case, the electronic device 1000 may use Equation 1 to calculate the first target performance value for the first size range as a 0.9*maximum performance value, the second target performance value for the second size range as a 0.4*maximum performance value, and/or the third target performance value for the third size range as a 0.7*maximum performance value. According to an embodiment of the present application, the electronic device 1000 may calculate the target performance value relatively high relative to the size of the object having a low ratio of the data set to be analyzed for which it is relatively difficult to recover performance through re-learning, thereby providing the effect of increasing the performance of the object recognition for the object with the low ratio.

Meanwhile, in relation to operation S1420, the aspect of calculating the target performance value was described assuming that the first to third ratios have specific values. However, this is only an example for convenience of description and should not be construed as limiting.

In the operation (S1430) of calculating the optimized pruning ratio for the layer based on the target performance value and the graph information, the electronic device 1000 may be implemented to calculate the optimized pruning ratio for the layer based on the graph information for each object size received through operation S1410 and the target performance values for each object size calculated through operation S1420. Specifically, the electronic device 1000 may calculate the optimized pruning ratio for the layer based on the first graph information for the first size range and the first target performance value for the first size range, the second graph information for a second size range and the second target performance value for the second size range, and/or the third graph information for the third size range and the third target performance value for the third size range.

Figure 7:
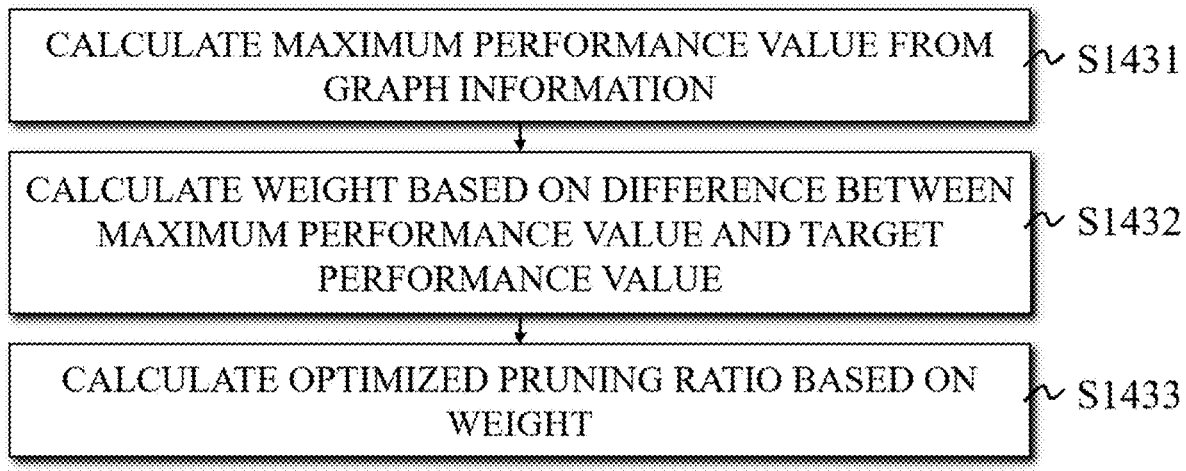
FIG. 7 is a flowchart specifying an operation of calculating an optimized pruning ratio according to an embodiment of the present application.

FIG. 7 is a flowchart specifying the operation of calculating the optimized pruning ratio according to an embodiment of the present application.

The operation (S1430) of calculating the optimized pruning ratio for the layer according to an embodiment of the present application may further include calculating the maximum performance value from the graph information (S1431), calculating the weight based on the difference between the maximum performance value and the target performance value (S1432), and/or calculating the optimized pruning ratio based on the weight (S1433).

Figure 8:
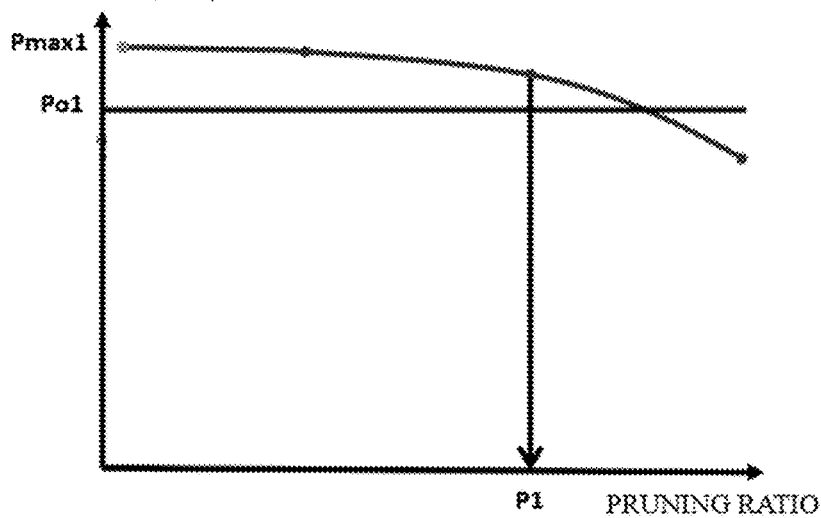
FIG. 8 is a diagram for describing an aspect of calculating the optimized pruning ratio according to an embodiment of the present application.
Figure 8:
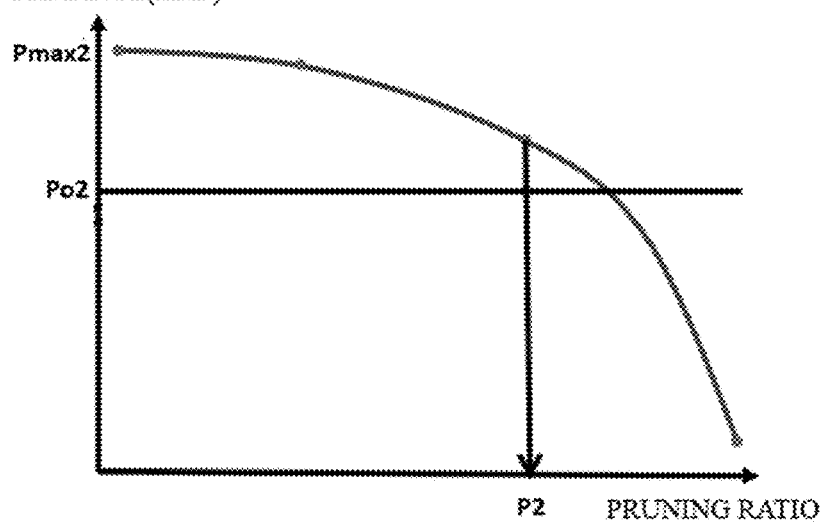
Figure 8:
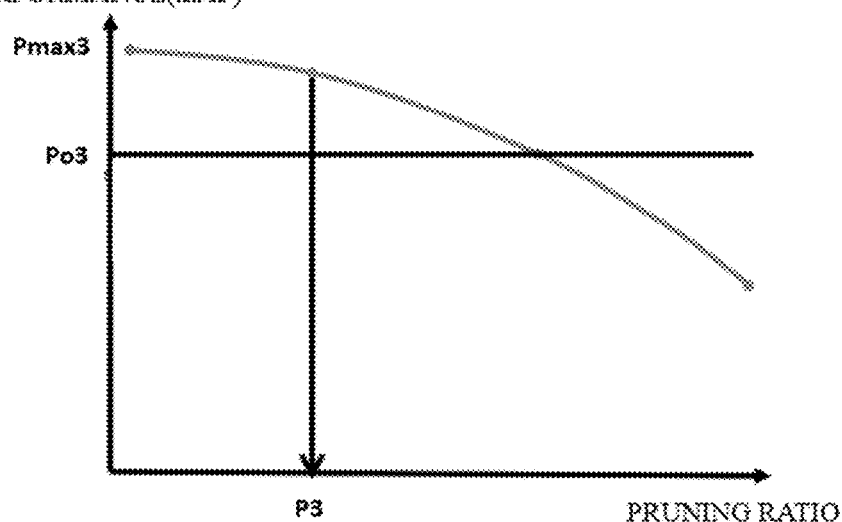

FIG. 8 is a diagram for describing an aspect of calculating the optimized pruning ratio according to an embodiment of the present application.

In the operation (S1431) of calculating the maximum performance value from the graph information, the electronic device 1000 may be implemented to acquire the maximum performance values for each object size from the graph information acquired through operation S1410. Specifically, the electronic device 1000 may calculate a first maximum performance value (e.g., Pmax1 in FIG. 8) from the first graph information for the first size range, calculate a second maximum performance value (e.g., Pmax2 in FIG. 8) from the second graph information for the second size range, and calculate a third maximum performance value (e.g., Pmax3 in FIG. 8) from the third graph information for the third size range. According to one example, the electronic device 1000 may acquire the largest value among the performance values according to the pruning ratio where data exists on each piece of graph information acquired for each object size as the first to third maximum performance values. However, this is only an example, and each of the first to third maximum performance values may be acquired as any appropriate value.

In the operation (S1432) of calculating the weights based on the difference between the maximum performance value and the target performance value, the electronic device 1000 may be implemented to calculate the weights for calculating the optimized pruning ratio based on the differences between the maximum performance values for each object size calculated through operation S1431 and the target performance values for each object size calculated through operation S1420. Specifically, the electronic device 1000 may calculate a first weight based on the difference between the first maximum performance value Pmax1 and the first target performance value Po1 for the first size range, calculate a second weight based on the difference between the maximum performance value Pmax2 and the second target performance value Po2 for the second size range, and calculate a third weight based on the difference between the third maximum performance value Pmax3 and the third target performance value Po3 for the third size range.

Hereinafter, the aspect of calculating the weights for calculating the optimized pruning ratio will be described in more detail.

According to an embodiment of the present application, the electronic device 1000 may apply the target performance values for each object size to the graph information (or pruning sensitivity information) for each object size to determine the candidate pruning ratios for each object size. As an example, the electronic device 1000 may acquire a first candidate pruning ratio from the first graph information by applying the first target performance value Po1 to the first graph information. For example, the electronic device 1000 may acquire the pruning ratio corresponding to the first target performance value Po1 or a performance value for which data adjacent to the first target performance value Po1 exists as the first candidate pruning ratio P1. As an example, the electronic device 1000 may acquire a second candidate pruning ratio from the second graph information by applying the second target performance value Po2 to the first graph information. For example, the electronic device 1000 may acquire the pruning ratio corresponding to the second target performance value Po2 or a performance value adjacent to the second target performance value Po2 as the second candidate pruning ratio P2. As an example, the electronic device 1000 may acquire a third candidate pruning ratio from the third graph information by applying the third target performance value Po3 to the third graph information. For example, the electronic device 1000 may acquire the pruning ratio corresponding to the third target performance value Po3 or a performance value adjacent to the third target performance value Po3 as the third candidate pruning ratio P3.

According to an embodiment of the present application, the electronic device 1000 may be implemented to calculate performance decline rates for each object size based on the differences between the maximum performance values for each object size and the target performance values for each object size and the candidate pruning ratios for each object size. As an example, the electronic device 1000 may calculate a first performance decline rate DR1 for the first size range based on the difference between the first maximum performance value and the first target performance value for the first size range and the first candidate pruning ratio. As an example, the electronic device 1000 may calculate a second performance decline rate DR2 for the second size range based on the difference between the second maximum performance value and the second target performance value for the second size range and the second candidate pruning ratio. As an example, the electronic device 1000 may calculate a third performance decline rate DR3 for the third size range based on the difference between the third maximum performance value and the third target performance value for the third size range and the third candidate pruning ratio.

According to an embodiment of the present application, the electronic device 1000 may be implemented to calculate the performance decline rates for each object size using Equation 2 below.

(1) First performance decline rate $(DR1) = \dfrac{P_{max1} - P_{O1}}{P_1}$  Equation 2

(2) Second performance decline rate $(DR2) = \dfrac{P_{max2} - P_{O2}}{P_2}$ (3) Third performance decline rate $(DR3) = \dfrac{P_{max3} - P_{O3}}{P_3}$ According to an embodiment of the present application, the electronic device 1000 may be implemented to calculate the weights for each object size to calculate the optimized pruning ratio based on the performance decline rates for each object size. According to one example, the electronic device 1000 may be implemented to determine the corresponding weight to be larger as the performance decline rates for each object size increase. For example, the electronic device 1000 may calculate the weights for each object size based on the performance decline rates for each object size using Equation 3 below.

(1) First weight $(W1) = \dfrac{e^{DR1/t}}{\sum_k e^{DR1,k/t}}$  Equation 3

(2) Second weight $(W2) = \dfrac{e^{DR2/t}}{\sum_k e^{DR2,k/t}}$ (3) Third weight $(W3) = \dfrac{e^{DR3/t}}{\sum_k e^{DR3,k/t}}$ t: Temperature According to an embodiment of the present application, the electronic device 1000 may calculate the optimized pruning ratio by applying a relatively large weight to the candidate pruning ratio of the object size with a relatively large performance decline rate, thereby providing the effect of preventing the performance decline due to the pruning and compressing the original model without the performance loss.

In the operation (S1433) of calculating the optimized pruning ratio based on the weight, the electronic device 1000 may be implemented to calculate the optimized pruning ratio based on the candidate pruning ratios for each object size and the weights for each object size calculated through operation S1432. Specifically, the electronic device 1000 may calculate the optimized pruning ratio by applying each weight calculated for each object size to the candidate pruning ratios for each object size calculated through operation S1432. For example, the electronic device 1000 may calculate the adjusted first pruning ratio by assigning a first weight W1 for the first size range to the first candidate pruning ratio P1 for the first size range. For example, the electronic device 1000 may calculate the adjusted second pruning ratio by assigning a second weight W2 for the second size range to the second candidate pruning ratio P2 for the second size range. For example, the electronic device 1000 may calculate the adjusted third pruning ratio by assigning a third weight W2 for the third size range to the third candidate pruning ratio P3 for the third size range. In this case, the electronic device 1000 may be implemented to calculate the optimized pruning ratio based on the adjusted first pruning ratio to the adjusted third pruning ratio. For example, the electronic device 1000 may calculate the optimized pruning ratio P* based on the weights for each object size and the candidate pruning ratios for each object size using Equation 4 below. Specifically, the electronic device 1000 may calculate the optimized pruning ratio P* by weight-summing the candidate pruning ratios determined for each object size with the weights calculated for each object size.

$$P* = W1 * P1 + W2 * P2 + W3 * P3 \quad \text{Equation 4}$$

According to an embodiment of the present application, the electronic device 1000 may be implemented to calculate the optimized pruning ratios for each of the plurality of layers by performing the compressing in operations S1100 to S1400 for each of the plurality of layers constituting the original model.

Figure 9:
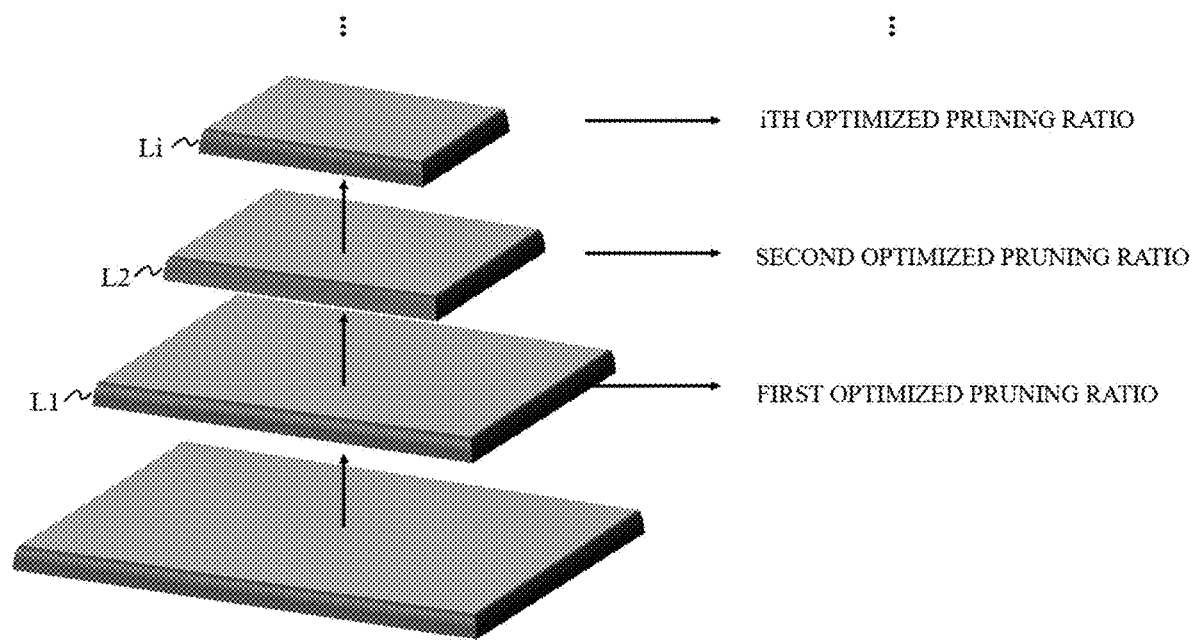
FIG. 9 is a diagram for describing an aspect of calculating the optimized pruning ratio for each layer of the original model according to an embodiment of the present application.

FIG. 9 is a diagram for describing an aspect of calculating the optimized pruning ratios for each layer of the original model according to an embodiment of the present application.

The original model may be composed of a plurality of layers including a first layer L1 and a second layer L2 located between the input layer and the output layer of the original model. In this case, the first layer L1 located relatively adjacent to the input layer compared to the second layer L2 specializes in recognizing the objects in the small size range included in the data set, and the second layer L2 located relatively adjacent to the output layer compared to the first layer L1 specializes in recognizing the objects in a relatively large size range rather than the small size included in the data set. In other words, since the size range of object recognition in which each layer specializes is different, there is a need to calculate the optimized pruning ratios for each layer.

Accordingly, the electronic device 1000 may be implemented to perform operations S1100 to S1400 on each of the plurality of layers constituting the original model to calculate the first optimized pruning ratio for the first layer L1, calculate the first optimized pruning ratio for the second layer L2, and calculate an ith optimized pruning ratio for an ith layer Li. Furthermore, the electronic device 1000 may be implemented to perform the pruning on the first layer L1 based on the first optimized pruning ratio in operation S1500, which will be described later, perform the pruning on the second layer L2 based on the second optimized pruning ratio, and perform the pruning on the ith layer Li based on the ith optimized pruning ratio.

Referring back to FIG. 3, according to an embodiment of the present application, the method of compressing a neural network model for object recognition may include operation S1500 of generating the compressed neural network model from the original model based on the results of performing the pruning.

In the operation S1500 of generating g the compressed neural network model from the original model based on the result of performing the pruning, the electronic device 1000 may acquire the compressed neural network model in which at least one layer of the original model is pruned based on the optimized pruning ratio calculated through operation S1400 (or operation S1433).

Meanwhile, although not illustrated in FIGS. 3 to 9, the method of compressing a neural network model for object recognition according to an embodiment of the present application may further include the operation of performing the training on the compressed neural network model. Specifically, in the operation of performing the training on the compressed neural network model, the electronic device 1000 may input the learning data set to the compressed neural network model to acquire a prediction value corresponding to the value identifying the object included in the learning data set, and update the weights included in the compressed neural network model based on the difference between the predicted value and the correct answer value pre-assigned to the learning data set to additionally train the compressed neural network model. According to an embodiment of the present application, by additionally training the compressed neural network model, it is possible to increase the performance of the compressed neural network model.

Meanwhile, in FIGS. 3 to 9, the object sizes are described by being illustrated as the first to third size ranges. However, this is only an example, and according to an embodiment of the present application, the original model may be implemented to be compressed in consideration of the size range of an arbitrary appropriate number of objects.

Hereinafter, the method of identifying an object using a compressed model according to an embodiment of the present application will be described in more detail with reference to FIGS. 10 and 11. FIG. 10 is a flowchart illustrating the method of recognizing an object included in a data set using a compressed neural network model according to an embodiment of the present application. FIG. 11 is a diagram for describing an aspect of recognizing an object included in a data set using a compressed neural network model according to an embodiment of the present application. Meanwhile, in describing the method of identifying an object using a compressed model according to an embodiment of the present application, for convenience of description, the content of compressing the original model described with reference to FIGS. 3 to 9 will be omitted. However, this is only for convenience of description and should not be construed as limiting.

The method of recognizing an object included in a data set using a compressed neural network model according to an embodiment of the present application includes receiving a target data set to be analyzed (S2100), and/or generating an output value corresponding to a value identifying an object included in the image of the target data set by inputting the target data set to the compressed neural network model (S2200).

In the operation (S2100) of receiving the target data set to be analyzed, the electronic device 1000 may perform an operation of receiving the target data set for object recognition through the communication module 1100. The target data set may be in the form of the image, and the target data set may include an area corresponding to at least one object included in the image.

Furthermore, in the operation (S2100) of receiving the target data set to be analyzed, the electronic device 1000 may receive the compressed model generated in operation S1500 through the communication module 1100. Receiving the compressed neural network model may mean receiving arbitrary data (e.g., structural information of the original model, operation library, and/or weight information of the original model) to appropriately execute the compressed neural network model.

In the operation (S2200) of generating the output value corresponding to the value identifying the object included in the image of the target data set by inputting the target data set to the compressed neural network model, the electronic device 1000 may input the image of the target data set to the input layer of the compressed neural network model, and receive the output value corresponding to the value identifying the object included in the image of the target data set calculated by the layer information and/or the weight information of the compressed neural network model through the output layer of the compressed neural network model.

According to the method of compressing a neural network model for object recognition, the method of recognizing an object using a compressed neural network model, and/or the device for performing the same according to an embodiment of the present application, by calculating the optimized pruning ratio using the sensitivity information generated in the training stage of the original model, it is possible to reduce the calculation costs.

According to the method of compressing a neural network model for object recognition, the method of recognizing an object using a compressed neural network model, and/or the device for performing the same according to an embodiment of the present application, by calculating the target performance value relatively higher for the size of the object with the low ratio of the data set to be analyzed which is relatively difficult to recover the performance through the re-learning, it is possible to increase the performance of the object recognition even for the size of the object with the low ratio.

According to an embodiment of the present application, a method of compressing a neural network model for object recognition, a method of recognizing an object using a compressed neural network model, and/or a device for performing the same, by applying the relatively large weight to the size of the object with the relatively large performance decline rate to calculate the optimized pruning ratio, it is possible to make the original model compressed by minimizing the performance loss due to the pruning.

According to an embodiment of the present application, a method of compressing a neural network model for object recognition, a method of recognizing an object using a compressed neural network model, and/or a device for performing the same, by calculating the optimized pruning ratio in consideration of the ratio of each object size included in the data set, it is possible to generate the compressed neural network model that shows the high performance even for the data sets including the objects of various sizes.

Effects of the present invention are not limited to the above-described effects, and effects that are not mentioned will be clearly understood by those skilled in the art to which the present invention pertains from the present specification and the accompanying drawings.

Features, structures, effects, etc., described in the above embodiments are included in at least an embodiment of the present invention, and are not necessarily limited only to an embodiment. Furthermore, features, structures, effects, etc., illustrated in each embodiment can be practiced by being combined or modified in other embodiments by those of ordinary skill in the art to which the embodiments pertain. Accordingly, content related to such combinations and modifications is to be interpreted as falling within the scope of the present invention.

Although an exemplary embodiment has been mainly described hereinabove, this is only an example and does not limit the present invention. Those skilled in the art to which the present invention pertains may understand that several modifications and applications that are not described in the present specification may be made without departing from the spirit of the present invention. That is, each component specifically shown in the embodiment may be implemented by modification. In addition, differences associated with these modifications and applications are to be interpreted as falling within the scope of the present invention as defined by the following claims.

What is claimed is:

1. A method of compressing, by an electronic device, a neural network model for object recognition, the method comprising:
   receiving an original model for object recognition trained based on a first data set;
   receiving a second data set of an analysis target;
   calculating object size information on sizes of objects included in an image of the second data set;
   calculating performance decline rates for each object size of the original model according to pruning, based on the calculated object size information;
   determining weight information on pruning ratios for each object size in consideration of the performance decline rates for each object size;
   determining an optimized pruning ratio for the second data set of at least one layer included in the original model based on the determined weight information; and
   generating a compressed neural network model from the original model by performing the pruning on the at least one layer based on the determined optimized pruning ratio, and
   wherein the object size information includes information on a first ratio of first objects corresponding to a first size range included in the image and a second ratio of second objects corresponding to a second size range included in the image,
   the first ratio is calculated based on number of the first objects in the image and total number of the total objects in the image including the first objects and the second objects, and
   the second ratio is calculated based on number of the second objects in the image and the total number.

2. The method of claim 1, wherein the calculating of the object size information further includes:
   receiving the number of pixels corresponding to the objects included in the image of the second data set;
   when the number of pixels corresponding to the object is larger than or equal to the predetermined number of reference pixels, classifying the object as the first object corresponding to the first size range, and when the number of pixels corresponding to the object is smaller than the number of reference pixels, classifying the object as the second object corresponding to the second size range; and
   calculating the object size information based on the number of objects classified as the first object and the number of objects classified as the second object.

3. The method of claim 1, wherein the determining of the performance decline rates for each object size further includes:
   receiving first graph information indicating sensitivity of the original model to the pruning ratio corresponding to the first size range and second graph information indicating the sensitivity of the original model relative to the pruning ratio corresponding to the second size range;
   calculating a first target performance value for the first size range based on the first ratio, and calculating a second target performance value for the second size range based on the second ratio; and
   calculating the performance decline rates for each object size based on the first target performance value and the first graph information, and the second target performance value and the second graph information.

4. The method of claim 3, wherein the first graph information and the second graph information are generated during the pruning after training of the original model using the first data set is completed.

5. The method of claim 3, wherein, when the first ratio is smaller than the second ratio, the first target performance value is calculated as a higher value than the second target performance value.

6. The method of claim 3, wherein the determining of the performance decline rates for each object size further includes:
   calculating a first maximum performance value from the first graph information and a second maximum performance value from the second graph information; and
   calculating first performance decline rates corresponding to objects in the first size range based on a difference between the first maximum performance value and the first target performance value, and calculating second performance decline rates corresponding to objects in the second size range based on a difference between the second maximum performance value and the second target performance value, and
   the determining of the weight information includes calculating first weights corresponding to the objects in the first size range included in the weight information based on the first performance decline rate and calculating second weights corresponding to the objects in the second size range included in the weight information based on the second performance decline rate.

7. The method of claim 6, wherein the determining of the optimized pruning ratio further includes:
   calculating a first pruning ratio corresponding to the first target performance value from the first graph information and calculating a second pruning ratio corresponding to the second target performance value from the second graph information;
   calculating an adjusted first pruning ratio by assigning the first weight to the first pruning ratio, and calculating an adjusted second pruning ratio by assigning the second weight to the second pruning ratio; and
   calculating the optimized pruning ratio based on the adjusted first pruning ratio or the adjusted second pruning ratio.

8. The method of claim 1, wherein the original model includes a first layer and a second layer located between an input layer and an output layer of the original model, and the first layer is located relatively closer to the input layer than the second layer, the determining of the optimized pruning ratio further includes calculating a first optimized pruning ratio for the first layer and calculating a second optimized pruning ratio for the second layer, and the generating of the compressed neural network model from the original model includes performing the pruning on the first layer based on the first optimized pruning ratio and performing the pruning on the second layer based on the second optimized pruning ratio to generate the compressed neural network model.

9. The method of claim 1, wherein the pruning ratios for each object size are determined for each object size based on graph information indicating the sensitivity of the original model, and a target performance value according to the pruning, and include a first pruning ratio for first objects corresponding to a first size range included in the image and a second pruning ratio for second objects corresponding to a second size range included in the image.

10. An electronic device, comprising:

a transceiver configured to receive an original model for object recognition on which training is completed; and a processor configured to perform compressing on the original model, wherein the processor is configured to receive an original model for object recognition trained based on a first data set, receive a second data set of an analysis target, calculate object size information on sizes of objects included in an image of the second data set, calculate performance decline rates for each object size of the original model according to pruning, based on the calculated object size information, determine weight information on pruning ratios for each object size in consideration of the performance decline rates for each object size, determine an optimized pruning ratio for the second data set of at least one layer included in the original model based on the determined weight information, and generate a compressed neural network model from the original model by performing the pruning on the at least one layer based on the determined optimized pruning ratio, and wherein the object size information includes information on a first ratio of first objects corresponding to a first size range included in the image and a second ratio of second objects corresponding to a second size range included in the image, the first ratio is calculated based on number of the first objects in the image and total number of the total objects in the image including the first objects and the second objects, and the second ratio is calculated based on number of the second objects in the image and the total number.

11. A method of recognizing, by an electronic device, an object included in a data set to be analyzed using a neural network model, the method comprising:

receiving the data set; and inputting the received data set to a compressed neural network model to generate an output value corresponding to a value identifying an object included in an image of the data set, wherein the compressed neural network model is compressed from an original model using an optimized pruning ratio determined for at least one layer of the original model based on ratios for each object size of objects included in the image of the data set, and the optimized pruning ratio is calculated for the data set based on the determined weight by calculating performance decline rates for each object size of the original model according to pruning based on ratios for each object size and determining weights for pruning ratios for each object size in consideration of the performance decline rates for each object size, and wherein the ratios for each object size include a first ratio of first objects corresponding to a first size range included in the data set and a second ratio of second objects corresponding to a second size range included in the data set, the first ratio is calculated based on number of the first objects in the image and total number of the total objects in the image including the first objects and the second objects, and the second ratio is calculated based on number of the second objects in the image and the total number.

12. The method of claim 11, wherein the original model is a model pre-trained using a data set different from the data set, and the optimized pruning ratio is determined by applying a target performance value calculated for each object size from ratios for each object size of the data set to pruning sensitivity information of the at least one layer calculated for each object size using the other data set.

13. The method of claim 12, wherein the optimized pruning ratio is determined by applying the target performance value to the pruning sensitivity information and weight-summing the pruning ratios for each object size determined for each object size with a different weight for each object size, the performance decline rates for each object size are determined based on the pruning sensitivity information and the target performance value, and the weight is determined to be larger as the performance decline rates for each object size increase.

14. The method of claim 13, wherein the performance decline rates for each object size are defined based on a difference between a maximum performance value calculated from the pruning sensitivity information and the target performance value, and the pruning ratios for each object size.

15. The method of claim 12, wherein when the first ratio is smaller than the second ratio, the target performance value determined for the first layer related to the first ratio is determined to be larger than the target performance value determined for the second layer related to the second ratio.

16. The method of claim 15, wherein the ratios for each object size are calculated based on the number of objects corresponding to the first size range and the number of objects corresponding to the second size range classified based on the number of pixels corresponding to the objects in the data set and the predetermined number of reference pixels.

17. The method of claim 11, wherein the pruning ratios for each object size are determined for each object size based on pruning sensitivity information indicating the sensitivity of the original model, and a target performance value according to the pruning, and include a first pruning ratio for the first objects corresponding to a first size range included in the image and a second pruning ratio for the second objects corresponding to a second size range included in the image.

\* \* \* \* \*